(No Model.)
M. B. WILLIAMS & H. MANVEL.
SPRING TOOTH HARROW AND DRILL.
No. 280,548. Patented July 3, 1883.
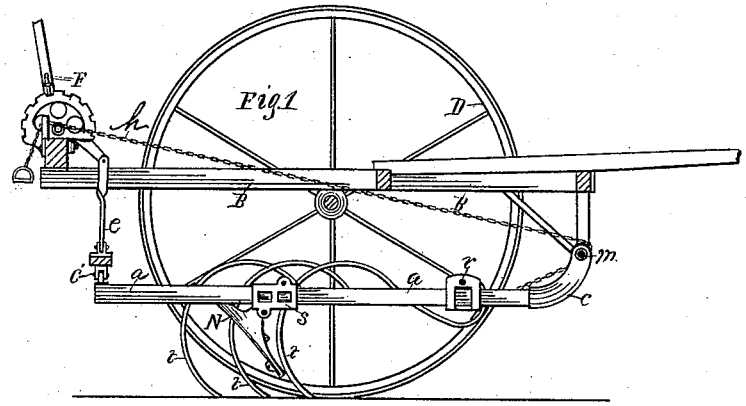
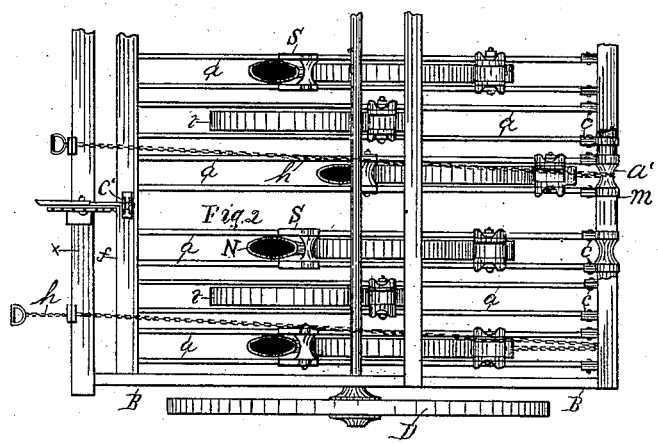
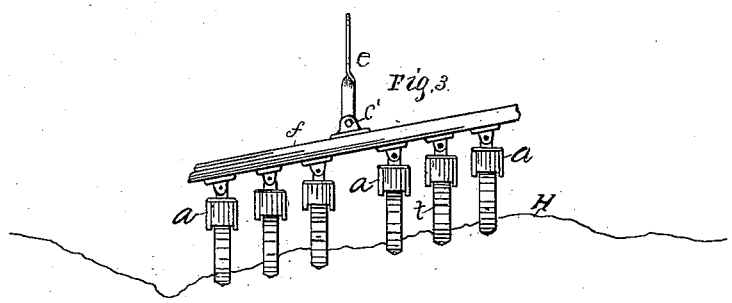
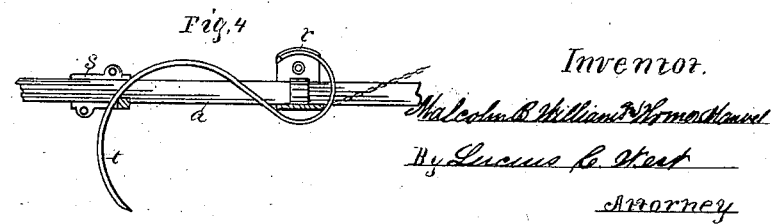
Attest.
Jno. C. Perkins
J. S. Ques
Inventor.
Malcolm B. Williams & Homer Manvel
By Lucius C. West
Attorney

UNITED STATES PATENT OFFICE.

MALCOLM B. WILLIAMS AND HOMER MANVEL, OF KALAMAZOO, MICHIGAN, ASSIGNORS TO B. S. WILLIAMS & CO., OF SAME PLACE.

SPRING-TOOTH HARROW AND DRILL.

SPECIFICATION forming part of Letters Patent No. 280,548, dated July 3, 1883.

Application filed December 19, 1882. (No model.)

*To all whom it may concern:*

Be it known that we, MALCOLM B. WILLIAMS and HOMER MANVEL, citizens of the United States, residing at Kalamazoo, county of Kalamazoo, State of Michigan, have invented a new and useful Spring-Tooth Harrow and Drill, of which the following is a specification.

The object of our invention consists in an improved construction for zigzagging the teeth of a harrow and the teeth and grain-tubes of a drill.

It further consists in a construction of tooth-beams to prevent lateral springing and twisting of the teeth.

It also consists in a mode of connecting independently-hinged tooth-bars with a cross connecting-bar and lifting-lever, whereby said beams more readily adapt themselves to the varying surface of the soil, and are prevented from twisting and cramping on the hinging-rod.

In the drawings forming a part of this specification, Figure 1 is a side elevation, partly in section, of a device containing our improvements; Fig. 2, a top view with one side broken away; Fig. 3, a detached part, showing the tooth-beams from the rear; and Fig. 4, a side view of the tooth-beam with one bar removed and the tooth and drill-tube holders in section.

The tooth-beams consist of two parallel bars, hinged at the forward end to a hinging-rod, $m$, in the usual manner of hinging independent share-beams. They are associated in clusters and connected at or near the rear end by a connecting-bar, $f$, said bar being connected with the lifting-lever F by bar $e$. By this means a number of beams, $a\ a$, may be raised at once and borne down upon as well as in former devices; but in order that the tooth-beams thus connected shall more readily adapt themselves to the varying surface of the soil H, Fig. 3, and not cramp on the hinging-rod, as before stated, we provide bar $f$ and beams $a\ a$ with hinges $c'$, as a connecting means, said hinges being open on the sides in a manner that they and the beams may swing laterally. The bar $e$ is hinged in like manner to the upper side of bar $f$ by means of a hinge, $c'$, reversed. Thus bar $f$ readily tips when the beams $a\ a$ adapt themselves, as before described. The teeth $t\ t$ are secured to the tooth-beams in a position that the bows of the teeth are located between the bars of said beams, or that they will come between them when the teeth spring while in use, Figs. 2 and 4. By this means all lateral springing and twisting of the teeth, causing them to sheer around hard places in the soil, is obviated, and teeth of greater proportions and elasticity may be employed, if desired.

In order to zigzag the teeth—that is, to throw some of them forward or out of a line with others—by a more simple and more conveniently operated device than heretofore, I secure them to a sliding holder, $r$, located on the bars of beam $a$, when, by means of a chain, $h$, fastened to the tooth or holder and passing around a pulley, $a'$, on the hinging-rod $m$, I am enabled to set the teeth temporarily forward, as in Fig. 2. By this plan a single tooth may be zigzagged to let obstructions pass between the teeth at a given point and all the teeth be kept at work during said change. The chain $h$ is carried to the rear of the harrow and passed through a slotted plate, the links of said chain being caught in the slot in holding the zigzagged tooth forward or out of line with the others. This slotted plate may be secured to the rear beam of frame B, or otherwise, as desired.

S is a sliding holder, in which a grain-tube, N, is hinged, said tube being located between the bars of beam $a$. The tooth $t$ passes loosely through said holder, as in Fig. 4. By this means the yielding grain-tube N is always kept in a near relationship with the tooth at its rear, is carried with said tooth when zigzagged, and when said tooth springs or oscillates in use the drill-tube and its holder play on the bars back and forth, thus not interrupting said spring. The grain-tube in this construction may be hinged in the holder or secured in a rigid manner, as a yielding capacity is imparted to it by the play of the holder S; but when hinged the play of the holder is not so great nor frequent.

Having thus described our invention, what we claim and desire to secure is—

1. In a harrow or drill, independently-hinged share-beams combined with a lifting-lever, and a bar connected with said beams and lever by means of laterally-working hinges, substantially as set forth.

2. The independently-hinged share-beams, their connecting-bar, and the lifting-lever, in combination with the laterally-working hinges having the open sides, whereby the share-beams more readily adapt themselves to the varying surface of the soil, and do not cramp on their hinging-rod, substantially as described.

3. In a harrow or drill, the combination, with independently-hinged share-beams and a lifting-lever, of a bar connecting with said beams by means of laterally-working hinges, whereby said beams readily adapt themselves to the varying surface of the soil, substantially as specified.

4. The double-bar share-beam having a pulley at one end, in combination with a tooth or share connected with said beam by a holder adapted to slide thereon, and a chain connecting with the share or holder and located around said pulley, all substantially as specified.

5. In a wheel harrow or drill, a share-beam having a pulley at the end, and a sliding share-holder and share, in combination with a chain for zigzagging the shares, and a slotted locking-plate, substantially as described and shown.

6. A share-beam and a share connected therewith by a sliding holder, in combination with a grain-tube connected with said beam at the rear of the share by a sliding holder, said tube-holder and share being connected with each other, whereby the share and grain-tube may be both zigzagged at the same time, substantially as shown.

7. A tooth-beam composed of two parallel bars, in combination with a bowed spring-tooth, the free or spring portion of the tooth adapted to play between the bars when springing, whereby lateral springing and twisting of said tooth are obviated by the edge of said free portion coming in contact with said bars, substantially as described.

8. A sliding holder having a grain-tube connected therewith, in combination with a springing or yielding tooth loosely located through said holder, whereby the tube is held in uniform relation with the share during its operation, substantially as set forth.

9. A sliding grain-tube holder, in combination with a grain-tube hinged therein and a spring metal tooth located through said holder, substantially as described.

10. A share-beam, a holder adapted to slide thereon, and a grain-tube hinged to said holder, in combination with a spring or yielding share connected with said beam by a sliding holder, said share being located through or loosely connected with the tube-holder, whereby the grain-tube and share may be zigzagged and also kept in proper relation during the spring of said share.

MALCOLM B. WILLIAMS.
HOMER MANVEL.

Witnesses:
ELMER E. FORD,
CHAS. H. BIRD.